United States Patent
Godsey et al.

(10) Patent No.: US 9,552,597 B2
(45) Date of Patent: Jan. 24, 2017

(54) ELECTRONIC COMMERCE FILE SYSTEM

(75) Inventors: Sandra Lynn Godsey, San Jose, CA (US); Neelakantan Sundaresan, Mountain View, CA (US)

(73) Assignee: eBay Inc., San Jose, CA (US)

( * ) Notice: Subject to any disclaimer, the term of this patent is extended or adjusted under 35 U.S.C. 154(b) by 748 days.

(21) Appl. No.: 13/399,112

(22) Filed: Feb. 17, 2012

(65) Prior Publication Data

US 2013/0218716 A1   Aug. 22, 2013

(51) Int. Cl.
*G06Q 30/06* (2012.01)
*G06Q 30/08* (2012.01)

(52) U.S. Cl.
CPC .................. *G06Q 30/06* (2013.01)

(58) Field of Classification Search
CPC .............................. G06Q 30/06; G06Q 30/08
USPC ................................................ 705/26.1, 27.1
See application file for complete search history.

(56) References Cited

U.S. PATENT DOCUMENTS

| | | | |
|---|---|---|---|
| 6,925,444 B1* | 8/2005 | McCollom et al. | 705/14.51 |
| 7,610,219 B2* | 10/2009 | Sayed | G06F 17/248 705/26.2 |
| 7,734,527 B2* | 6/2010 | Uzo | 705/37 |

* cited by examiner

*Primary Examiner* — James Zurita
(74) *Attorney, Agent, or Firm* — Schwegman, Lundberg & Woessner, P.A.

(57) ABSTRACT

In various example embodiments, a system and method for an electronic commerce file system are provided. In example embodiments, a selection of an item contained in a folder of an electronic commerce file system is received. The item is offered for sale by an electronic commerce provider, and the electronic commerce file system resides locally on a client device. Based on a type of the folder, a set of actions are provided for selection, with the set of actions to be performed with respect to the item. A selection of an action to be performed with respect to the item is received. The action is performed with respect to the item, with the action being performed between the electronic commerce file system and the electronic commerce provider via a network.

14 Claims, 15 Drawing Sheets

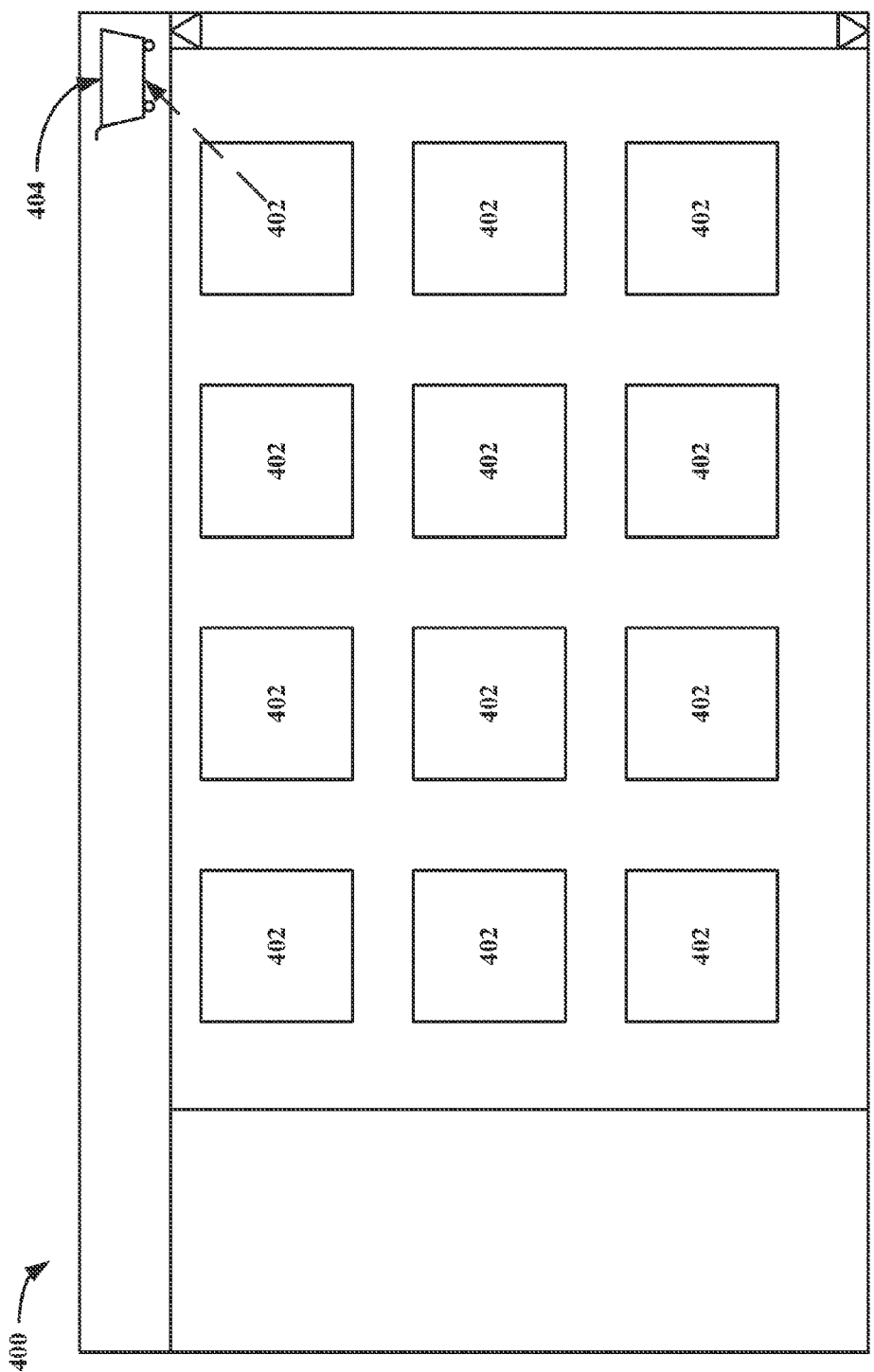

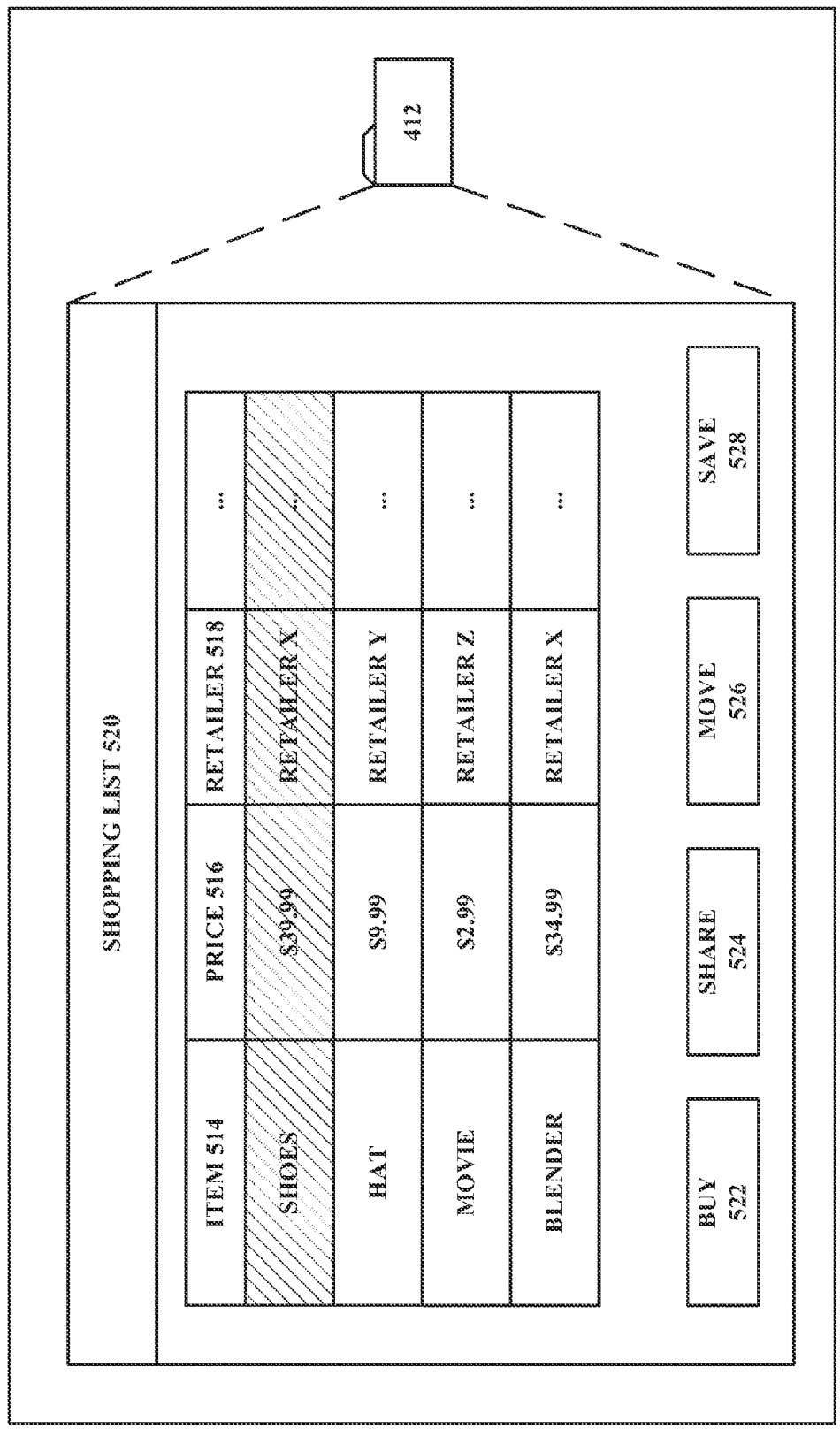

ELECTRONIC COMMERCE FILE SYSTEM

FIELD

The present disclosure generally relates to a data organization system, and in specific example embodiments, to an electronic commerce file system.

BACKGROUND

Electronic commerce today generally consists of commerce transacted on a website of an Internet retailer. Users are able to search and browse for items presented on web pages and can purchase items by placing them in a virtual shopping cart maintained on the Internet retailer website for check out. Recent advances have extended electronic commerce to mobile devices, where users may use apps to transact electronic commerce. Despite the recent advances, users generally still must access a website or app to conduct electronic commerce transactions.

BRIEF DESCRIPTION OF DRAWINGS

Various ones of the appended drawings merely illustrate example embodiments of the present invention and cannot be considered as limiting its scope.

FIG. 4A is a block diagram illustrating a user interface of an electronic commerce website, according to some embodiments.

FIG. 5C is a block diagram illustrating a user interface of an electronic commerce file system, according to some embodiments.

DETAILED DESCRIPTION

Figure 1:
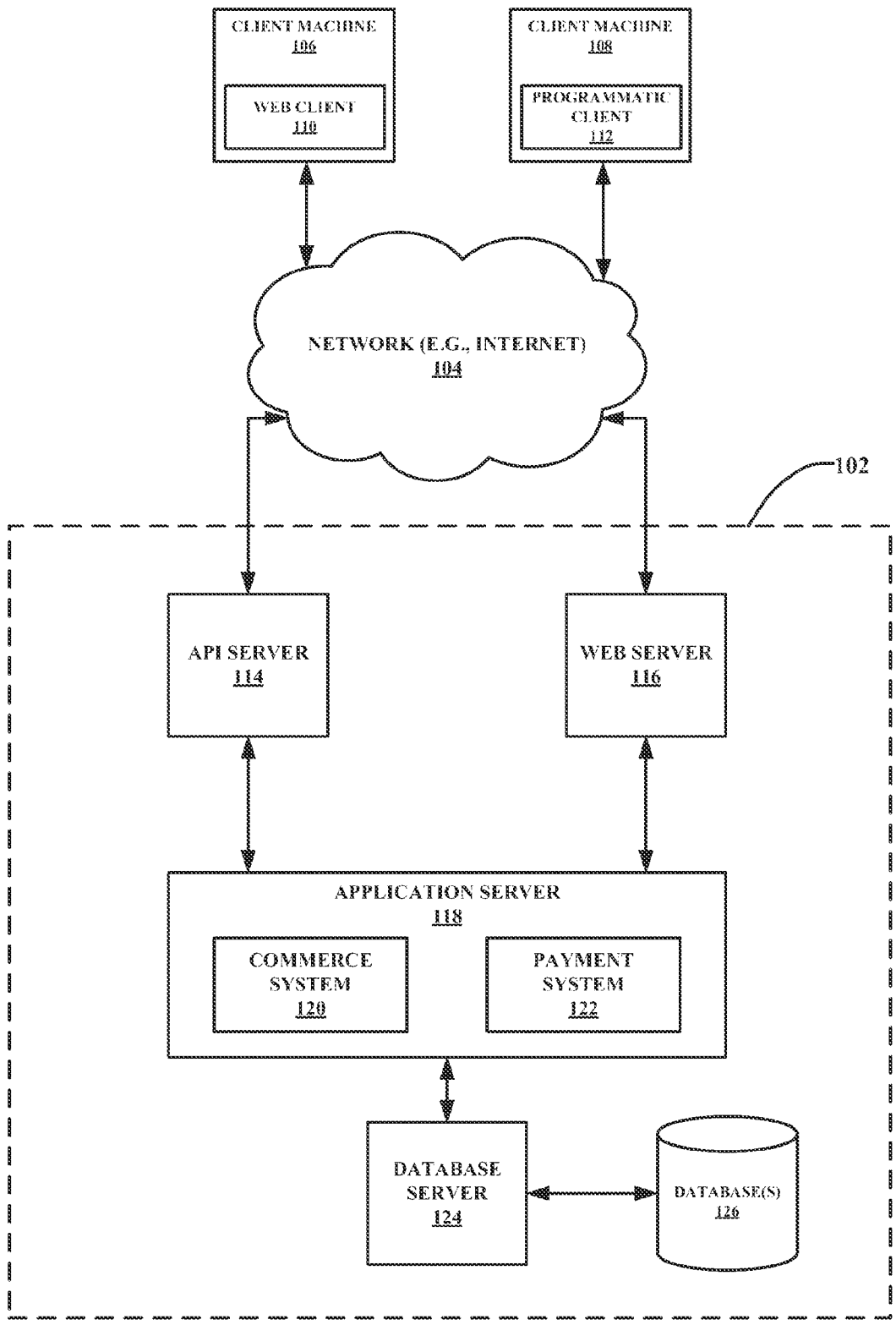
FIG. 1 is a block diagram illustrating an example embodiment of a network architecture of a system used to provide an electronic commerce file system, according to some embodiments.

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

As used herein, the term "or" may be construed in either an inclusive or exclusive sense. Additionally, although various example embodiments discussed below focus on an electronic commerce environment, the embodiments are given merely for clarity in disclosure. Thus, any type of electronic marketplace, publication, electronic commerce, social networking, search provider, operating system, or electronic business system and method, including various system architectures, may employ various embodiments of the electronic commerce file system system and method described herein and may be considered as being within a scope of example embodiments. Each of a variety of example embodiments is discussed in detail below.

Example embodiments described herein provide systems and methods for an electronic commerce file system for use in transacting electronic commerce. In example embodiments, an electronic commerce file system (hereinafter "eCFS") may reside on a client device and may control a user's electronic commerce interactions with one or more electronic commerce providers. In some embodiments, the eCFS may be considered as an application layer residing above the operating system layer that leverages the file system structure of the operating system to create an electronic commerce-based file system. In other embodiments, the eCFS may be an application, a browser extension, a plug-in, or a widget capable of interfacing with electronic commerce provider websites.

In some embodiments, the eCFS comprises one or more containers folders) that are each capable of storing "files" that represent items in which a user has expressed some degree of interest. In some embodiments, the files may be wrappers that encapsulate information about an item offered for sale by a third party commerce provider. In other embodiments, the files may be records that have various attributes capable of being actionable or linked to external content (such as content residing on a third party system). Each container may be capable not only of interfacing with third party websites, but may contain logic that enables the container to perform certain actions with respect to the files contained in the container. In addition, each file may have logic associated therewith that enables actions to be performed with respect to the item represented by the file. In some embodiments, the eCFS may perform shopping cart functions in an offline or off-website environment, thereby enabling a user to continue transacting electronic commerce without remaining on a website of a commerce provider. Off-line actions may be synchronized with one or more third party systems at a predetermined time. In some embodiments, depending on the type of container, different actions may be performed with respect to the items included in the container or with respect to items not yet included in the container.

In some embodiments, items listed on any website or app may be added to one or more containers (hereinafter "folders") through functionality such as drag-and-drop or buttons. When an item is added to a folder, logic in the folder may cause the folder to interface with the website or app on which the item was listed to extract or retrieve data (including metadata) related to the item. This data may be used to populate the file corresponding to the item, in some embodiments, the folder may contain logic that enables the folder to continually update the data concerning the item. The folder may offer various actions that may be performed with respect to the item. For example, a user may decide to buy an item from the folder, thereby resulting in the eCFS interfacing with the website to consummate the purchase of the item.

In some embodiments, a rules engine of the eCFS may permit a user to specify rules that govern what items are added to folders and how items are to be treated once contained in the folders. For example, based on specified rules, the eCFS may initiate a search on its own for items meeting the specified rules and may populate folders with items meeting the criteria of the rules. In other embodiments, alerts and notifications may be generated based on certain criteria being met in the rules. In these embodiments, the eCFS may monitor certain items or websites for changes or events that trigger the criteria set forth in the rules.

In some embodiments, notifications and alerts may be based on traffic monitoring, such as through a communication fabric or framework that couples sellers, buyers, services and capabilities. The traffic may identify a sale or price lowering of an item, a change in the availability of an item, or the listing of an item for sale which is identified by a rule in the eCFS.

In some embodiments, the format of the eCFS is replicated on a website so as to provide a common interface for the user. As today's computer users are most familiar with the folder structure, such as on the PC desktop, wherein files and documents are organized within the folder structure. For example, a user may have a file labeled "Office Documents" with a subfolder labeled "Office Equipment." The subfolder may be viewed to list all of those items that the user has purchased for the office, and further lists those items the user desires to purchase. When the user visits a website of an office supply store, the shopping cart may be replaced or supplemented by a local folder structure consistent with the eCFS. The local folder identifies the items desired that are for sale at that store. In some embodiments, the local folder may include items purchased with comparison pricing, and so forth. The user may drag and drop items into the local folder, such as a new item for purchase; the new item will appear in the local folder and the eCFS folder on the user's device. Note that the eCFS folder may be replicated on multiple devices, such as mobile device, PC, and so forth, wherein the folders sync to maintain consistency. The use of a local folder allows the user to shop and discover items at the office supply store online with a familiar format. Further, by implementing the local folder, the web store allows easy access directly. When the user desires to purchase an item, the local folder may be updated to identify those items for purchase and then drag and dropped into a shopping cart or purchase button, icon, logo and so forth to complete the purchase.

In some embodiments, the shopping site may implement a purchase folder, where items to purchase are placed in the folder. Items may be dragged into the purchase folder from the desk top eCFS folder. In some embodiments, the web store purchase folder may have an alias on the user's desktop; the user may add items to the purchase folder on the desktop to initiate a purchase. The aliased purchase folder includes rules to facilitate the purchase. While the example systems provided herein illustrate an ecommerce system and associated file system, the file system and structure may be applied to other environments as well. For example, the folder and file structure may be applicable to a social networking site or a search engine, wherein the folders are defined according to the subject matter used therein. In one example, the folder structure on the desk top may include multiple search formats, where subfolders may identify more detailed, narrow search keywords or criteria. In the social networking application, the folder system may define circles of friends, connections, networks, wherein the information in each folder is accessed by a specific group of contacts. A variety of other applications are considered which may be implemented in the folder structure. The folder structure is a commonly understand mechanism for information organization and retrieval, and therefore, serves as a common platform across many applications and environments. The folder structure is intuitive and easy to use.

By using the example embodiments disclosed herein, a user will be provided with a system for enhancing their electronic commerce experience. Accordingly, one or more of the methodologies discussed herein may expand a user's electronic commerce experience by removing the experience from within a website such that a user may have access to the electronic commerce experience from any computing environment. Additionally, by automating certain electronic commerce tasks, efficiency and simplicity of transacting electronic commerce is increased for the user's benefit.

With reference to FIG. 1, an example embodiment of a high-level client-server-based network architecture 100 to enable personalization of search results is shown. A networked system 102, in an example form of a network-server-side functionality, is coupled via a communication network 104 (e.g., the Internet, wireless network, cellular network, or a Wide Area Network (WAN)) to one or more client devices 106 and 108. FIG. 1 illustrates, for example, a web client 110 operating via a browser (e.g., such as the INTERNET EXPLORER® browser developed by Microsoft® Corporation of Redmond, Wash. State), and a programmatic client 112 executing on respective client devices 106 and 108.

The client devices 106 and 108 may comprise a mobile phone, desktop computer, laptop computer, tablet computer, or any other computing device having communication capabilities that a user may utilize to access the networked system 102. In some embodiments, the client device 106 may comprise a display module (not shown) to display information (e.g., in the form of user interfaces). In further embodiments, the client device 106 may comprise one or more of a touch screen, accelerometer, camera, microphone, and UPS device. The client devices 106 and 108 may be a device of a user, which is used to perform a transaction involving one or more items within the networked system 102. In some embodiments, the client devices 106 and 108 may include an electronic commerce tile system (eCFS). The eCFS may manage electronic commerce transactions between the client devices 106 and 108 and one or more networked systems, such as networked system 102. The eCFS will be discussed in further detail with reference to FIG. 2. In one embodiment, the networked system 102 is a network-based marketplace that manages items, publishes publications comprising item listings of products available on the network-based marketplace, and manages payments for these marketplace transactions. While the client devices 106 and 108 are shown as capable of communicating with the networked system 102. It will be appreciated that client device 106 and 108 are capable of communicating and transacting with multiple networked systems.

An Application Program Interface (API) server 114 and a web server 116 are coupled to, and provide programmatic and web interfaces respectively to, one or more application servers 118. The application servers 118 host a commerce system 120 and a payment system 122, each of which may comprise one or more modules, applications, or engines, and each of which may be embodied as hardware, software, firmware, or any combination thereof. The application servers 118 are, in turn, coupled to one or more database servers 124 facilitating access to one or more information storage repositories or database(s) 126. In one embodiment, the databases 126 are storage devices that store information to be posted (e.g., publications or listings) to the commerce system 120. The databases 126 may also store digital goods information in accordance with example embodiments.

In example embodiments, the commerce system 120 publishes content on a network (e.g., Internet). As such, the commerce system 120 provides a number of publication and marketplace functions and services to users that access the networked system 102. In example embodiments, the commerce system 120 is discussed in terms of a marketplace environment. However, it is noted that the commerce system 120 may be associated with a non-marketplace environment such as an informational (e.g., search engine) or social networking environment.

The payment system 122 provides a number of payment services and functions to users. The payment system 122 allows users to accumulate value (e.g., in a commercial currency, such as the U.S. dollar, or a proprietary currency, such as points, miles, or other forms of currency provide by a private entity) in their accounts, and then later to redeem the accumulated value for products (e.g., goods or services) that are made available via the commerce system 120 or elsewhere on the network 104. The payment system 122 also facilitates payments from a payment mechanism (e.g., a bank account, PayPal™, or credit card) for purchases of items via any type and form of a network-based marketplace.

While the commerce system 120 and the payment system 122 are shown in FIG. 1 to both form part of the networked system 102, it will be appreciated that, in alternative embodiments, the payment system 122 may form part of a payment service that is separate and distinct from the networked system 102. Additionally, while the example network architecture 100 of FIG. 1 employs a client-server architecture, a skilled artisan will recognize that the present disclosure is not limited to such an architecture. The example network architecture 100 can equally well find application in, for example, a distributed or peer-to-peer architecture system. The commerce system 120 and payment system 122 may also be implemented as standalone systems or standalone software programs operating under separate hardware platforms, which do not necessarily have networking capabilities.

Figure 2:
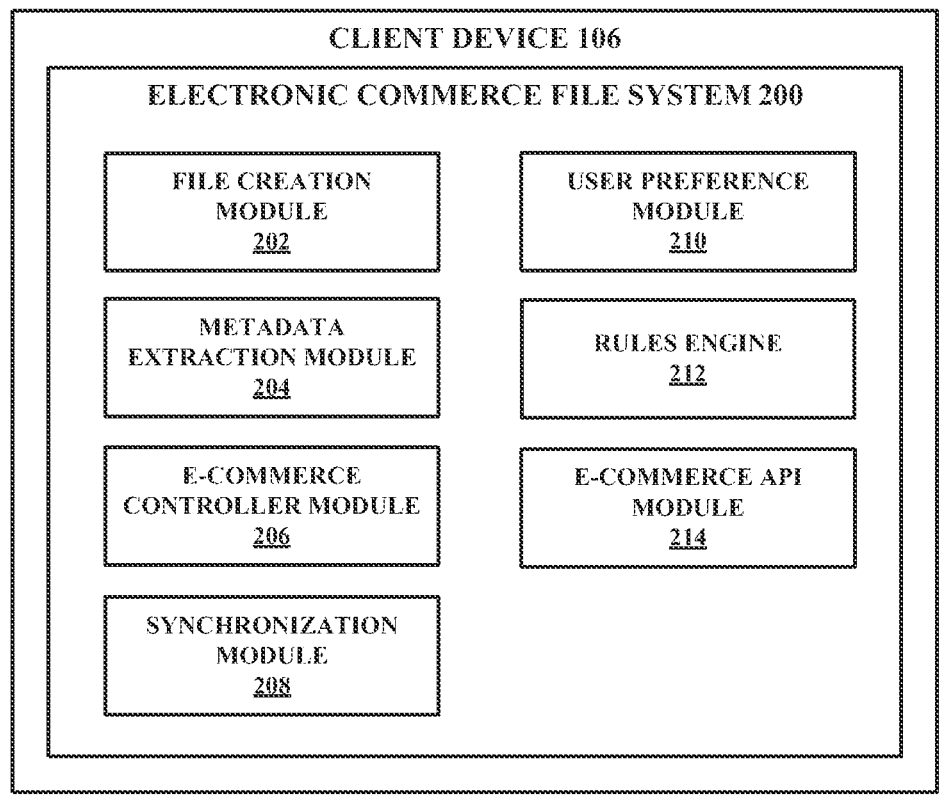
FIG. 2 is a block diagram illustrating an example embodiment of an electronic commerce file system, according to some embodiments.

Referring now to FIG. 2, an example block diagram illustrating multiple components that, in one embodiment, are provided within the eCFS system 200 of the client device 106 is shown. In some embodiments, the eCFS may be a software abstraction layer residing above an operating system layer, or it may be an application, browser extension, or browser plug-in. The eCFS may manage electronic commerce transactions and interactions between the client device 106 and one or more networked systems, such as the networked system 102. The multiple components of the eCFS may be communicatively coupled (e.g., via appropriate interfaces), either directly or indirectly, to each other and to various data sources, to allow information to be passed between the components or to allow the components to share and access common data. Furthermore, the components may access the one or more storage devices or memory contained in the client device 106.

While the eCFS 200 is illustrated with multiple modules, alternate embodiments may include a different combination of modules, alternate modules and fewer modules according to use and application. The various modules may be added independently after the eCFS is established on the user device according to some embodiments.

A file creation module 202 of the eCFS 200 may create files corresponding to items for inclusion in one or more folders of the eCFS 200. In some embodiments, the files may be containers that can store an item object of any format. By standardizing the format of items from different vendors and retailers, the eCFS 200 may operate on files irrespective of their source. In other embodiments, the files may be wrappers that encapsulate data corresponding to an item obtained from a third party system. In yet other embodiments, the files may be records that contain data extracted from an item maintained by a third party system. The files themselves may handle varying types and formats of data, including textual data, symbols, codes, audio data, video data, and audiovisual data.

When an item is selected for inclusion into the folder, the folder may create a file corresponding to the item. Depending on the folder holding the file, the file may have different properties and actions associated therewith. For example, if a folder is a shopping list folder, the file may have actions such as "buy," "compare," and "check for coupon." In some embodiments, the file creation module 202 may use the existing data organization structure and commands of the operating system to create folders and files that conform to other folders and files used in the operating system. The file creation module 202 may map or assign additional actions and properties to the files and folders for use with the eCFS 200.

A metadata extraction module 204 may operate in conjunction with the file creation module 202 to extract data from items maintained by third party systems, such as networked system 102. The metadata extraction module 204 may extract data such as item descriptions, prices, user reviews, auction bids, item quantities, item discounts, and the like from third party systems. As a result, it may be possible for the user to view any and all information about an item by selecting the corresponding file in a folder. In other words, the user may not have to access the specific commerce provider's application or website to view this information. Rather, the user may view this information from the desktop or home interface of the client device 106. In some embodiments, the metadata extraction module 204 may periodically or continually update information contained in the files of the eCFS 200 by interfacing with the third party systems retailers) to obtain (e.g., by pulling, polling, requesting) updated information. For example, the metadata extraction module 204 may refresh or update the price of an item as it changes, or may obtain current discounts for an item as it maintained in the eCFS 200. In some embodiments, the web store or third party may push updates to the user based on previous purchases, the user's wish list, or other analysis.

An electronic commerce controller module 206 may manage electronic commerce transactions for the eCFS 200. The controller module 204 may provide functionality to the folders and files and may receive user inputs to perform actions with respect to selected files. The controller module 204 may issue commands and requests to third party systems in response to user inputs. For example, if a user wishes to buy an item contained in a folder, the user may select the "Buy" button after selecting the appropriate file in the folder. The controller module 206 may translate the "Buy" command into the appropriately recognized command for the third party system offering the item and may issue the command to the third party system. The controller module 206 may facilitate the transaction between the user and the third party system such that user involvement is kept to a minimum.

A synchronization module 208 may perform synchronization actions between the eCFS 200 and third party systems, as well as among the user devices. The eCFS 200 may be designed such that electronic commerce actions may be performed in an offline manner, that is, when the user is not connected to a network or is not accessing a website or app of a third party system (e.g., retailer). Synchronization may entail interfacing with a third party system and comparing item data stored on the client device 106 with item data maintained by the third party system. In some embodiments, the comparison may entail determining when the item data was last updated on either the client device or the third party system to determine which set of data is current. Item data on the client device 106 that is more current may reflect actions performed by a user with respect to the item data, including things such as a command to purchase an item, a change in the quantity of the item desired to be purchased, and so forth. In these cases, the synchronization module 208 may transmit the commands and item data changes to the third party system for processing and handling. Item data that is more current on the third party system may reflect an update to the item data, such as a change in price, change in inventory, change in item description, and so forth. In these cases, the third party system may transmit the changes to the client device 106 to update the item data maintained on the client device 106. In some cases, the third party system may send the changed item data as a delta or differential update to minimize network traffic.

A user preference module 210 may store user preferences concerning electronic commerce transactions. As the eCFS 200, via the electronic commerce controller module 206, may resolve transactions involving items with minimal user involvement, it may use user preferences to streamline the electronic commerce transacting process. User preferences may include a preferred shipping address, a preferred shipping method, one or more saved billing methods (e.g., credit card numbers and accounts, bank account information, stored value account information, credits), a billing address, and the like. The controller module 206 may look up user preferences when conducting a transaction and may use the user preferences to populate the necessary fields to complete the transaction.

In other embodiments, the user preference module 210 may monitor user transactions and may derive and store observed user preferences. For example, the user preference module 210 may observe that on the first of every month, the user buys 2 packages of diapers. The user preference module 210 may store the item, brand, and quantity, among other things, of the diapers and, in some embodiments, may cause an automatic purchase of the 2 packages of diapers on the first of every month. In other embodiments, the user preference module 210 may observe that a user always buys branded items over generic labeled items for a particular item. The user preference module 210 may store this preference and apply it to future transactions. In some embodiments, the user preference module 210 may track a user's item inventory through the user's purchase of items. For certain items, the item inventory may be adjusted by the user as the user consumes the item. By tracking the user's item inventory, the user preference module 210 may simplify the task of selling off the user's inventory if the user no longer wishes to keep a particular item. The controller module 206 may then process the item to be sold and arrange for its sale on one or more third party sites (e.g., eBay®, Amazon®, Craigslist®).

A rules engine 212 may generates and enforces rules that apply to the eCFS 200. A user may specify rules governing various aspects of the eCFS 200. For example, the user may specify a rule to always perform a price comparison of an item on x different retailer sites before making a purchase. In another example, the user may specify a rule that a package of toilet paper should be bought every month on the first of the month. Rules may affect other aspects of the eCFS 200, such as searching for items (e.g., always search among certain retailer websites, only search for items on sale, etc.), shipping and billing rules (e.g., use this credit card for transactions, always use 2-day shipping, etc.), inventory management (e.g., purchase more of an item if the inventory drops below x items), and the like. The controller module 206 may perform a rules check when acting on behalf of the user and may apply any rule whose criteria are met.

There are a variety of rules which may be configured depending on the user preference, device capabilities, or web store capabilities. Similarly, the rules may be built depending on the type of articles sold or processed by the web store. In a social networking environment, the rules may identify groups of friends/contacts and the handling of information with respect to each group. For digital media sites, such as an on-demand Internet streaming media service or digital book service, the eCFS may be configured to store the digital content purchased, rented or consumed on trial. The rules for processing digital media may provide bookmarks, commentary, and so forth. The rules of handling movies or video may organize according to viewed movies, genre, recommendations, and so forth. The ability to review the lists in a simple folder and file structure allows the user to select those movies or videos to view next.

In some embodiments, the rules engine 212 may auto-generate its own set of rules based on observed user behavior. In some embodiments, the rules engine 212 may operate in conjunction with the user preference module 210 to translate observed user preferences into rules.

An e-commerce API module 214 may provide a set of interfaces to the eCFS 200 to interface with third party systems. The interfaces may permit third party systems to communicate with the eCFS 200. In addition, each third party system may publish a set of its own Application Programming Interfaces (APIs) by which external parties may interface with the third party system. The e-commerce API module 214 may use its knowledge of third party APIs to interface with the third party systems, such as when the eCFS 200 is transacting with a third party system.

Although the various components of the eCFS 200 have been defined in terms of a variety of individual modules and engines, a skilled artisan wilt recognize that many of the items can be combined or organized in other ways and that not all modules or engines need to be present or implemented in accordance with example embodiments. Furthermore, not all components of the eCFS 200 have been included in FIG. 2. In general, components, protocols, structures, and techniques not directly related to functions of exemplary embodiments have not been shown or discussed in detail. The description given herein simply provides a variety of exemplary embodiments to aid the reader in an understanding of the systems and methods used herein.

Figure 3:
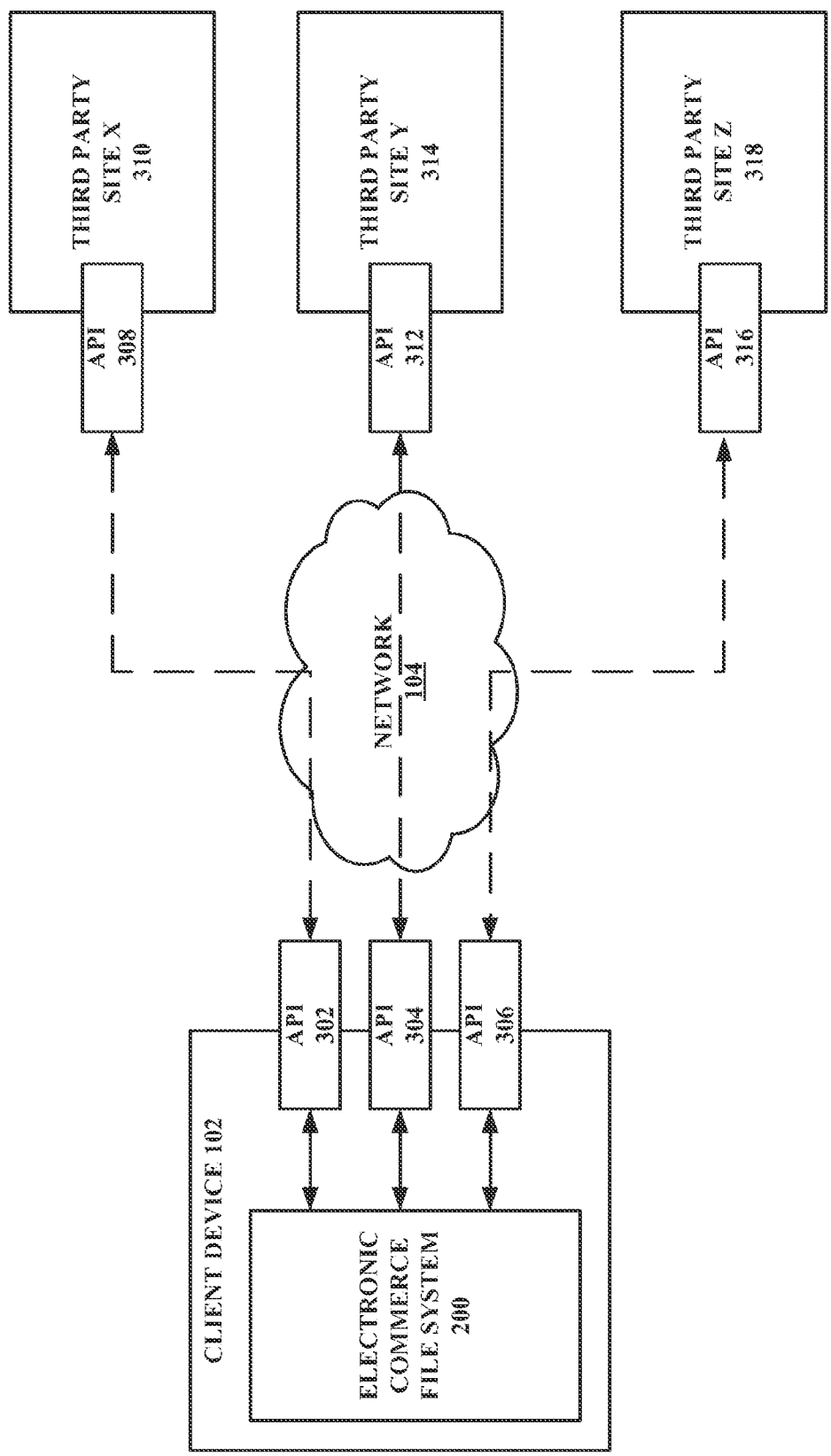
FIG. 3 is a block diagram illustrating a network architecture in which a device executing an electronic commerce file system communicates with one or more third party systems, according to some embodiments.

FIG. 3 is a block diagram illustrating a network architecture in which a device executing an electronic commerce file system communicates with one or more third party systems, according to some embodiments. In the embodiment of FIG. 3, a client device 106 may execute therein an eCF 200 that organizes and acts on the electronic commerce activities of the client device 106. The eCFS 200 may interact with multiple third party systems (e.g., eBay®, Amazon®, Target®, Macy's®, Safeway®) over network 104 using one or more APIs to communicate with APIs of the third party systems. For example, the eCFS 200 may use API 302 to communicate with third party system X 310 via API 308. Similarly, the eCFS 200 may use API 304 to communicate with third party system Y 314 via API 312 and API 306 to communicate with third party system Z 318 via API 316. The eCFS 200 may format requests and commands to each third party system in a manner that conforms to the requirements of the respective API of the third party system.

FIG. 4A is a block diagram illustrating a user interface of an electronic commerce website, according to some embodiments. In the embodiment of FIG. 4A, a high-level user interface of a website 400 is shown. The website 400 may be a website of an electronic commerce provider. Items 402 may be presented in a grid format for display to a user. In a title bar, a shopping cart may be presented. In various embodiments, items may be added to the shopping cart or dragged to the shopping cart. The shopping cart may be a container that holds the items that the user is interested in purchasing. In order fur the user to purchase the items, the user generally performs a checkout process by which the cost of the items is tabulated, payment is arranged, and shipping information is entered. The checkout process generally requires that the user remain on the website 400 until the checkout is complete. In the event the user leaves the website, in some embodiments, the contents of the shopping cart are discarded, while in other embodiments, the contents of the shopping cart persist (via a cookie, for example) but the checkout is not completed. Although the discussion of FIG. 4A concerns a website, it could equally apply to an app running on a mobile, tablet, laptop, desktop or other computing device.

Figure 4B:
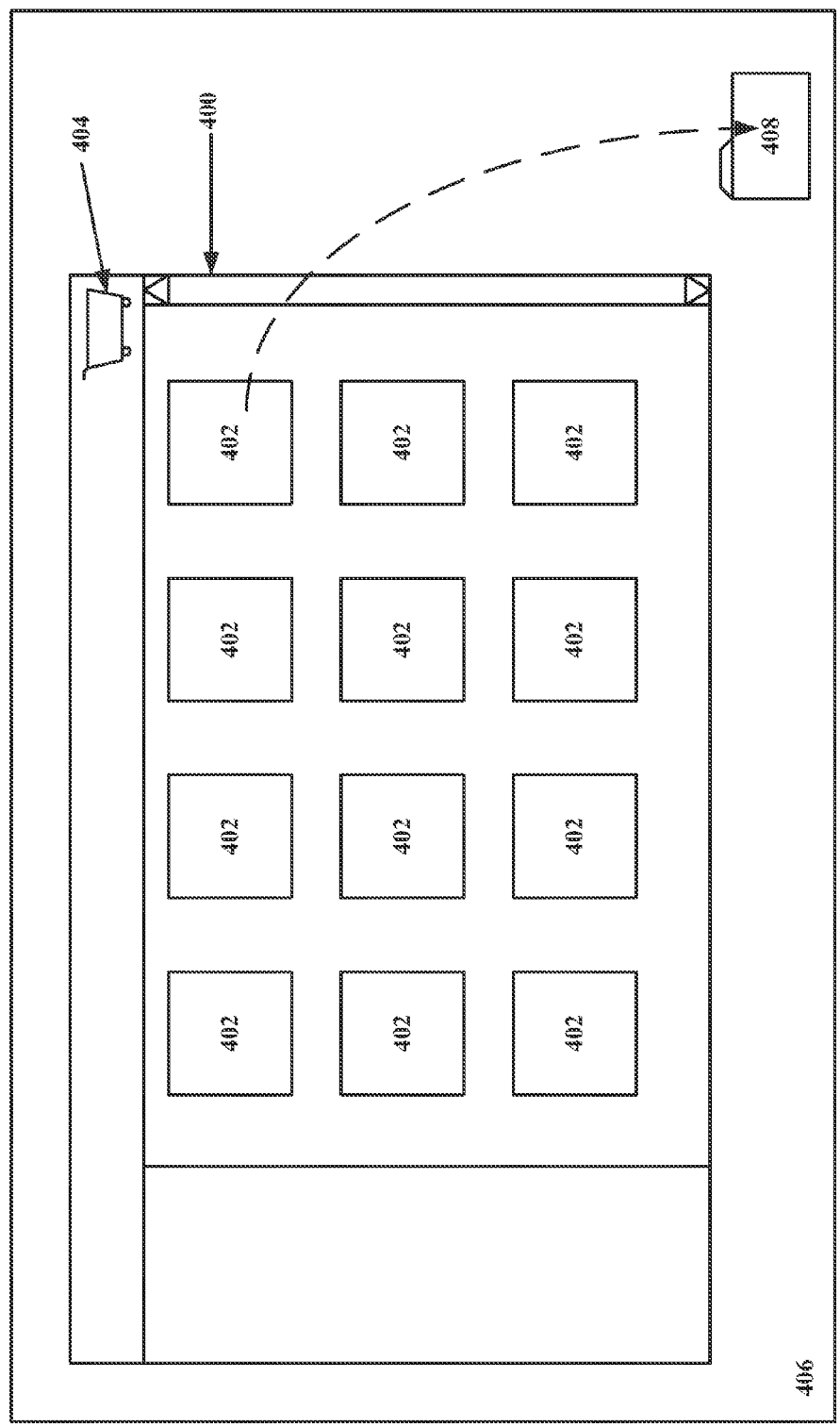
FIG. 4B is a block diagram illustrating a user interface of an electronic commerce file system, according to some embodiments.

FIG. 4B is a block diagram illustrating a user interface of an electronic commerce file system, according to some embodiments. In the embodiment of FIG. 4B, the website 400 of the electronic commerce provider as discussed with reference to FIG. 4A is presented in a window of a browser application. The website 400 presents items 402 arranged in a grid format (although other presentation formats may be used) and items may be placed in a shopping cart 404. The browser window displaying the website 400 may be part of a computing environment 406, such as a desktop of an operating system. On the desktop may reside one or more folders 408 associated with the eCFS 200. Items may be added or dragged-and-dropped into the eCFS folder 408, which in some embodiments, may act like a shopping cart that has been disassociated with the website 400. When an item 402 is added to the folder 408, the eCFS 200 may interface with the website 400 to download any or all pertinent item information to the folder 408. This information may be made available within the folder 408 such that a user examining the item in the folder 408 may have at his disposal all information related to the item. This availability obviates the need for the user to open the browser application and navigate to the website 400 to read about the item 402. In some embodiments, the user may perform actions on the item contained in the folder 408 without any interaction with the website 400. Actions performed on the item 402 in the folder 408, to the extent they affect the website, may be transmitted to the website in the background by the eCFS 200, and the interaction and transaction between the eCFS 200 and the website 400 may be handled with minimal user interaction. Although FIG. 4B has been discussed with reference to a desktop environment 406, the desktop environment is not limited to a desktop computer. FIG. 4B may apply equally to any user interface or home screen for a computing device.

Figure 4C:
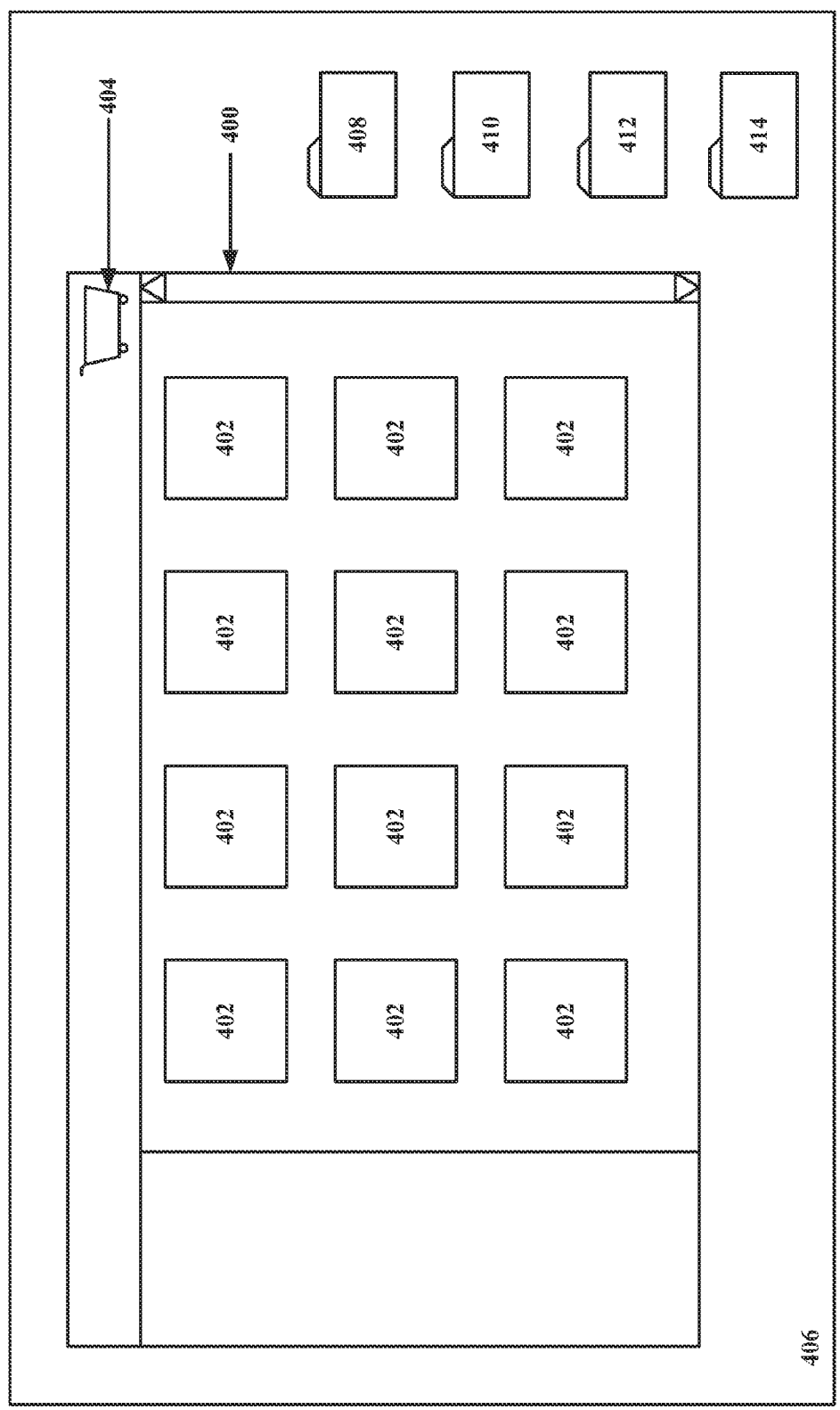
FIG. 4C is a block diagram illustrating a user interface of an electronic commerce file system, according to some embodiments.

FIG. 4C is a block diagram illustrating a user interface of an electronic commerce file system, according to some embodiments. Referring to FIG. 4C, a desktop environment 406 may include a browser application window displaying a website 400 of an electronic commerce provider. The website 400 may present one or more items 402 offered for sale. A shopping cart residing within the website 400 may offer users the ability to purchase items of interest through the website 400. Four folders 408, 410, 412, 414 belonging to the eCFS 200 may be shown as residing on the desktop environment 406. The folders may be of different folder types that represent different types of lists or collections. For example, folder 408 may represent a shopping list, white folder 410 may represent a wish list of items. Folders 412 and 414 may represent lists for other users or may represent different types of the same lists (e.g., household shopping list, grocery store shopping list), among other things.

Items may be added or dragged from the website 400 to any one of the folders 408, 410, 412, 414. Items within the folders themselves may be moved from one folder to another folder. Each folder may have an associated set of actions that may be performed on items contained therein and an associated set of properties and attributes. The actions and properties associated with each folder may depend on the type of folder. For example, a shopping list may have an associated buy action and an associated check for coupon action, while a wish list may have a share action and a publish action associated therewith. Different attributes for each item may be displayed in the folder depending on the type of folder. For example, an item displayed in the shopping list folder may have the name, price, and quantity desired attributes displayed. If the same item is displayed in a wish list folder, the item may have its name, price, and a description of the item displayed.

Figure 5A:
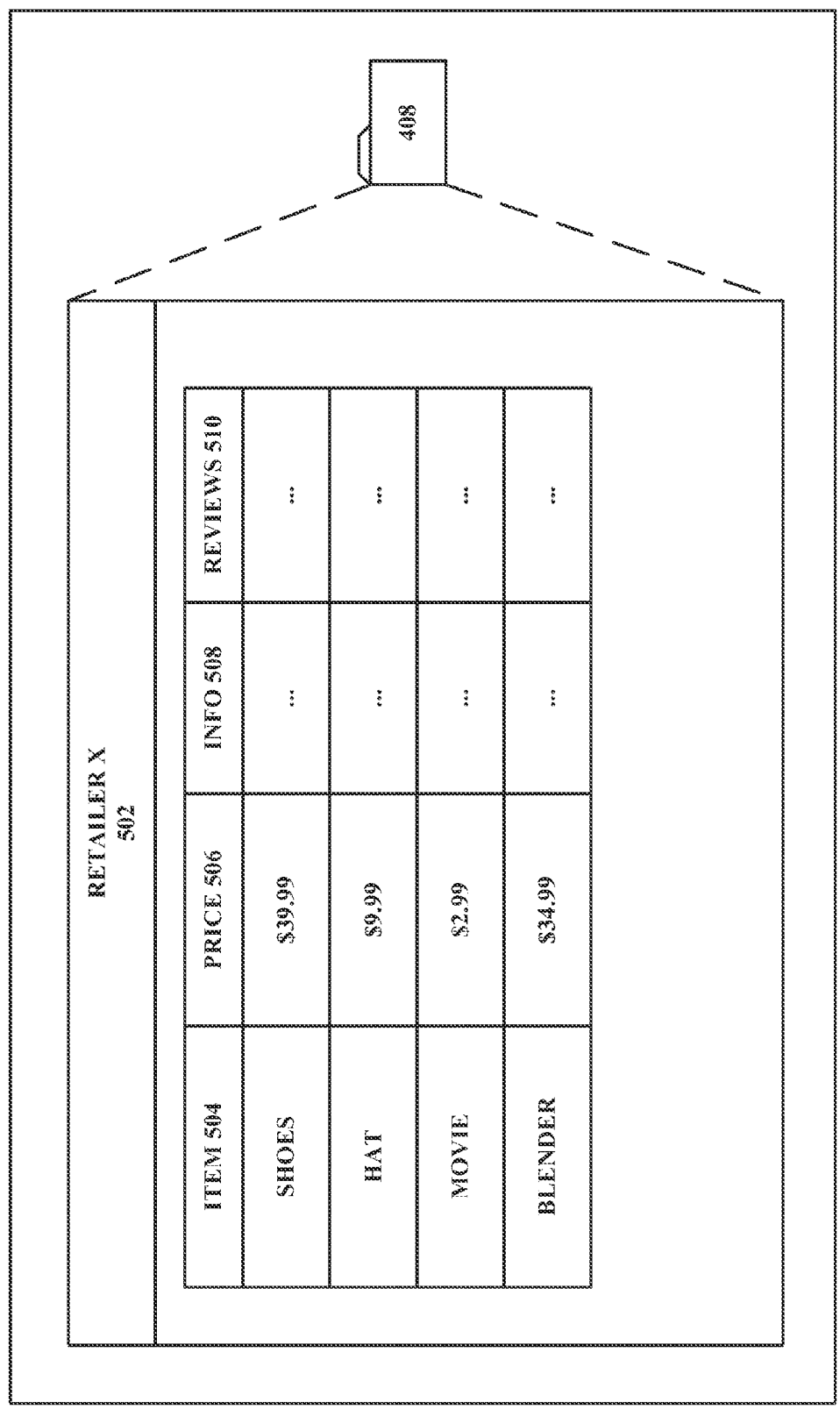
FIG. 5A is a block diagram illustrating a user interface of an electronic commerce file system, according to some embodiments.

FIG. 5A is a block diagram illustrating a user interface of an electronic commerce file system, according to some embodiments. In some embodiments, opening a folder 408 to examine the contents of the folder may reveal a set of items contained in the folder. In some embodiments, the items my be represented by icons capable of being selected to examine for further detail. In other embodiments, the items may be presented in a table or list format. Referring to FIG. 5A, folder 408 represents items desired front a particular electronic commerce provider. The items may be presented in a table format, with certain attributes for each item displayed. In the example embodiment of FIG. 5A, the item 504, price 506, information 508, and reviews 510 for each item are displayed. To the extent relevant, each attribute for each item may be selected to display further detail. For example, the information 508 and reviews 510 for each item may be too long to display within the allotted table cell, but selection of either attribute may cause the cell to expand or may cause a new window to open that displays the attribute information. The speed in which the information is displayed may be instantaneous or nearly instantaneous given the storage of the information within the eCFS 200, thereby obviating a need to retrieve the information from the website of Retailer X 502. Other embodiments may use alternate columns to identify other parameters, such as wherein each item has a corresponding rating identified by stars or other rating identifier. In social network applications, items may be subject matter related to a particular user's group, wherein each group is listed along with the number of users, and/or other information. The social network application may identify individuals within a group and parameters associated therewith. For example, columns may identify when there is an update made to their page in the network, or to which networks each individual belongs. The information may be used to make additional connections among members of the group, such as to identify individuals interested in a specific musical group, television show, movie, and so forth.

Figure 5B:
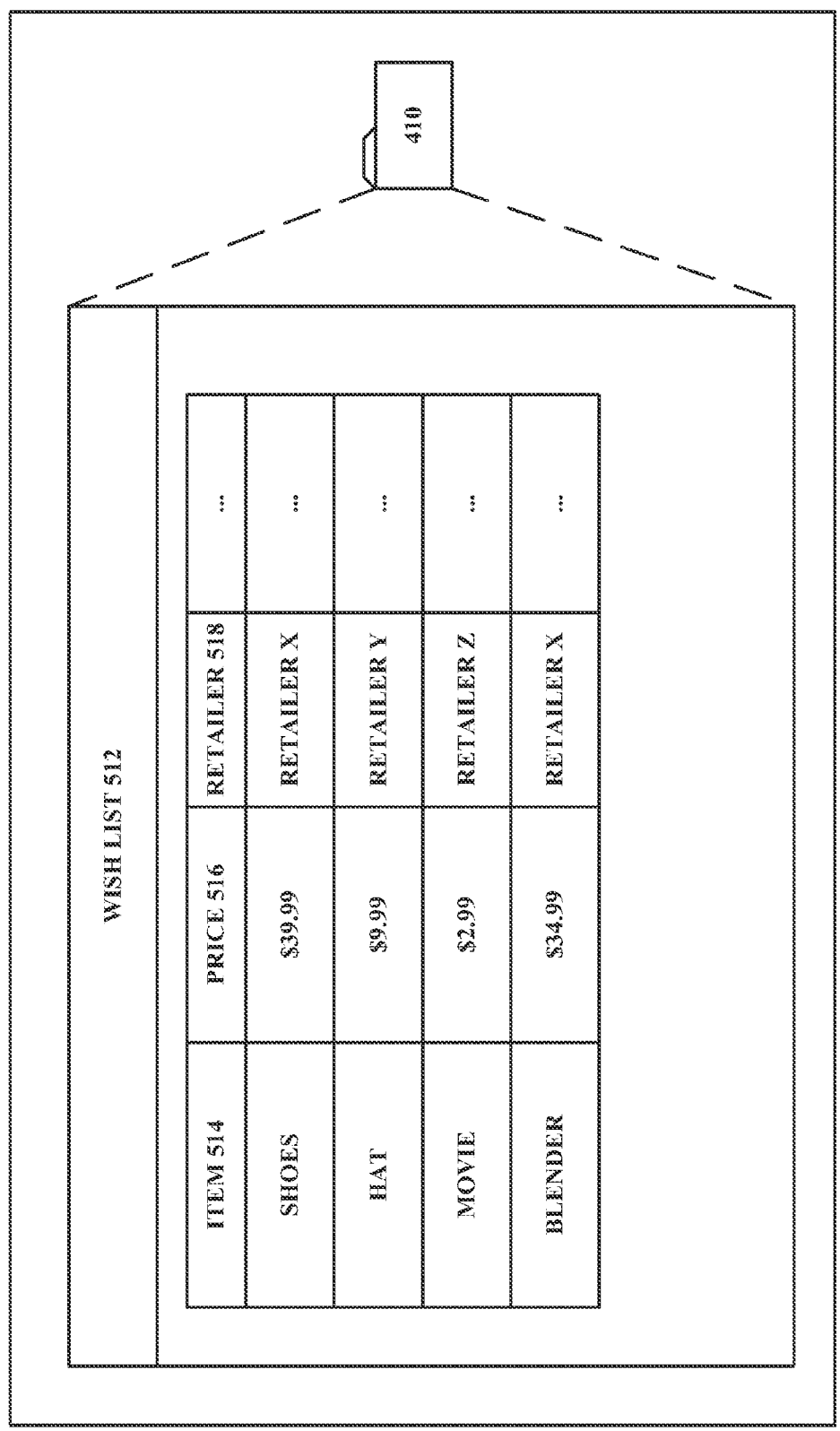
FIG. 5B is a block diagram illustrating a user interface of an electronic commerce file system, according to some embodiments.

FIG. 5B is a block diagram illustrating a user interface of an electronic commerce file system, according to some embodiments. FIG. 5B illustrates a folder of a different folder type from that of the folder 408 depicted in FIG. 5A. In FIG. 5B, a wish list folder type is shown. The wish list may represent items that the user desires to acquire, and accordingly, may span multiple retailers. The folder 410 may depict the items on the wish list 512 in a table format, as individual icons, in a grid format, or in any other presentation format. A table format is shown for example purposes. The table may display certain attributes for the items, such as the item name 514, price 516, and retailer 518, among other things. The attributes displayed may be user configurable and the user may add, remove, and resize attributes as desired. This format allows the user to compare multiple items. In one scenario, a user drags the item from the web store site to the eCFS, and the eCFS obtains additional information from the site about the item. For example, if the item is a car, the eCFS may fill in the table, or suggest columns, identifying make, year, engine size, fuel type, weight, fuel efficiency, and so forth. As additional items are placed into the folder, the system compiles similar information for each item. A rule may search for pricing available from a variety of sources.

FIG. 5C, is a block diagram illustrating a user interface of an electronic commerce file system, according to some embodiments. FIG. 5C illustrates an example embodiment of a folder 412 representing a shopping list 520. In this case, the shopping list 520 may include a number of items, including shoes, a hat, a movie, and a blender. Attributes for each item may be displayed in a table format, although other presentation formats may be used. Referring to FIG. 5C, a name of the item 514, price 516, and retailer 518 offering the item are shown. The items may be selected to perform an action with respect to the item. In the example shown herein, a user may select the item "Shoes," thereby causing the item to be highlighted or otherwise emphasized. A set of associated actions (in the form of selectable user interface elements) that may be performed with respect to the item may be displayed within the folder 412. For example, a Buy button 522, a Share button 524, a Move button 526, and a Save button 528 may be displayed. Selection of any of the buttons may result in the eCFS 200 performing the action. For example, if the user selects the Buy button 522, the eCFS 200 may prepare a purchase command to the retailer offering the item. The eCFS 200 may package the purchase command in a format that conforms to the retailer's API and may transmit the purchase command to the retailer. The command may include information such as an identification of the item to be purchased, payment information, shipping information, and a quantity of the item to be purchased, among other things. The retailer may process the purchase command and return a response confirming or denying the transaction. A denial of the transaction may include a reason for the denial, while a confirmation of the transaction may include a receipt, a confirmation number, a tracking number for the shipment, an estimated shipping date, and the like.

While the embodiments described in the figures illustrate tabular formats, alternate embodiments may implement other structures to implement a folder structure. The columns may be expanded or reduced as desired by the user. The table may be sorted according to a variety of criteria. The eCFS may implement a format that identifies each item by photograph, drawing, icon and so forth.

Figure 6:
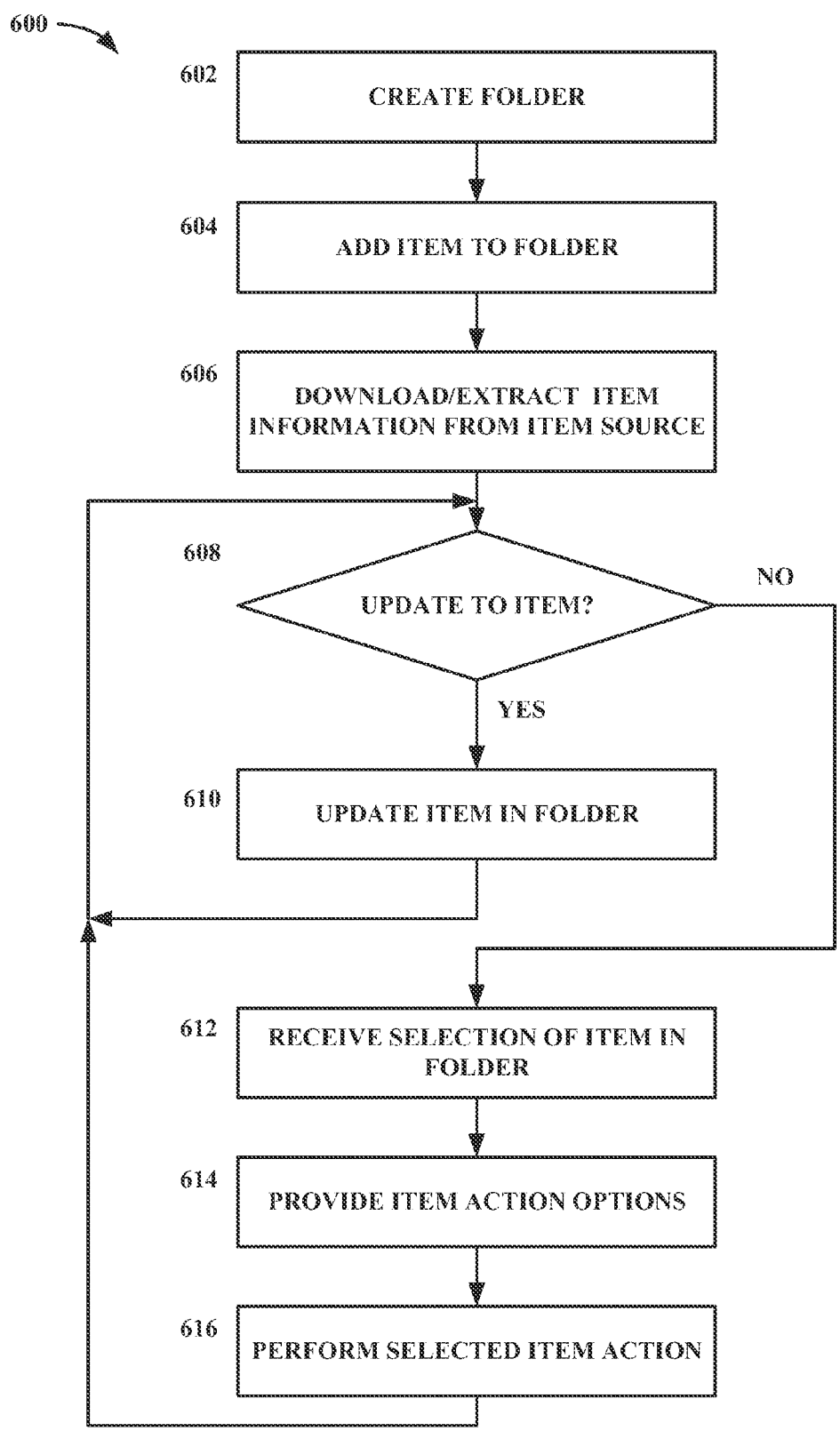
FIG. 6 is a flow diagram of an example method for transacting electronic commerce using an electronic commerce file system, according to some embodiments.

FIG. 6 is a flow diagram of an example method for transacting electronic commerce using an electronic commerce file system, according to some embodiments. At block 602, the eCFS 200 may create a folder on the user device. A user may specify the type of folder to be created, and folder handling, such as sharing with others, allowing access by third party sites, and so forth. Based on the type of folder specified, the folder may have a set of default attributes and actions mapped or assigned thereto. For example, if the folder is a shopping list, the folder may have a set of attributes and actions for purchasing items. If the folder is a wish list, the folder may have a set of attributes and actions associated with learning about the items and sharing the items with friends.

At block 604, an item may be added to the folder. The item may be obtained from one or more retailer or electronic commerce provider websites or apps. The item may be dragged and dropped into the folder or may be added into the folder using a script or command. In some embodiments, a browser plug-in or extension is used to interact with items displayed within websites or apps such that a copy of the item may be extracted and added to the folder. In some embodiments, the user may move an item into the folder by an option linked to the item, such as a pop-menu that appears when the user mouses over the item or clicks on the item. The pop-up menu may include a command to add the item to the user's eCFS folder. The web store may then track when each user adds an item to their folder.

At block 606, when an item is added to a folder, the eCFS 200 may extract or obtain associated item information from the website or app for inclusion in the folder. Item information may include metadata, textual descriptions of the item, images, video, audio and other associated data. The item information may be made available in the folder such that a user does not need to visit the website or app to read about the item; rather, the user may access the information by accessing the locally stored folder. The user may then investigate and consider each item when not connected to the network or Internet, such as when in flight or other area without connectivity.

At decision block 608, the eCFS 200 may check for an update to the item. The eCFS 200 may check for item updates continually, on a periodic basis, at predetermined intervals, or upon the occurrence of an event. If an item update exists, at block 610, the eCFS 200 may download the update and apply the update to the existing item information to yield updated item information. Item updates may include event occurrences such as price changes, new discounts, inventory changes, new versions of the item, and the like. The example method 600 thereafter may return to decision block 608 to continually monitor for additional updates to the item(s) in the folder.

If no item update is available, at block 612, the eCFS 200 may receive the selection of an item contained in the folder. At block 614, the eCFS 200 may provide the user with a set of actions that may be performed with reference to the selected item. The set of actions may be provided in the form of one or more selectable user interface elements. At block 616, the eCFS 200 may perform an action selected by the user. The action may be transacted between the eCFS 200 and a third party system with minimal user involvement. For example, the action may consist of one or more requests and responses between the eCFS 200 and the third party system. In some embodiments, at the conclusion of the action, the user may receive a confirmation that the action was or was not performed. Following the selection and/or performance of an item action, the example method 600 may return to decision block 608 to determine if further updates to the item(s) in the folder are available.

Figure 7:
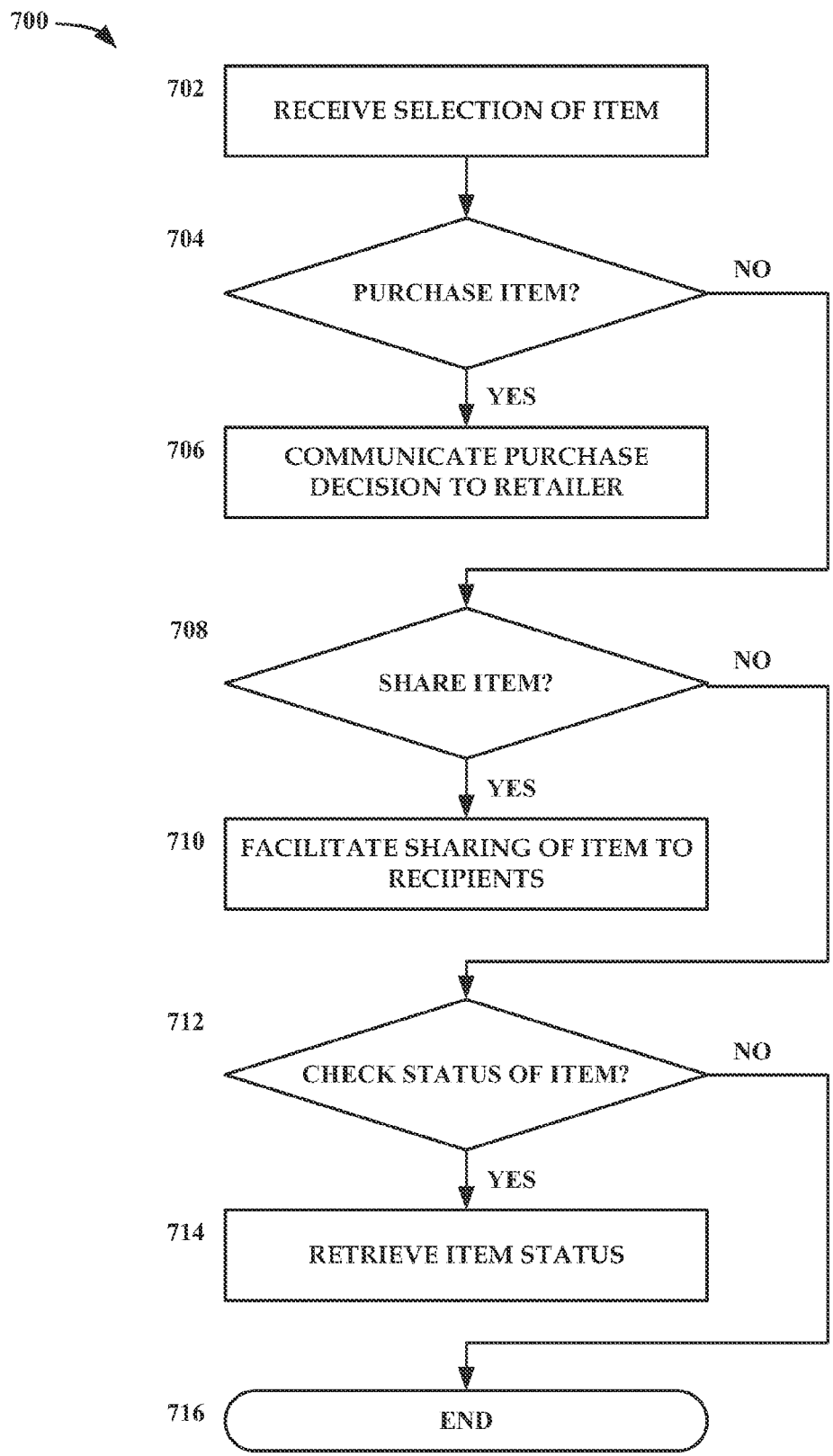
FIG. 7 is a flow diagram of an example method for transacting electronic commerce using an electronic commerce file system, according to some embodiments.

FIG. 7 is a flow diagram of an example method for transacting electronic commerce using an electronic commerce file system, according to some embodiments. At block 702, the eCFS 200 may receive the selection of an item contained in a folder. The selection may be performed by an input device (e,g., mouse, keyboard) or input gesture (e.g., swipe, tap, double tap). At decision block 704, it is determined if an action selected to be performed with respect to the selected item is a purchase action. If so, at block 706, the eCFS 200 may generate a purchase request that specifies relevant information, including one or more of the item or service to be purchased, the quantity to be purchased, payment information, shipping information, requested reservation or appointment times, and the like.

If the action to be performed is not a purchase action, the example method proceeds to decision block 708, where it is determined if the action is to share the item. If so, at block 710, the item is shared with other users specified by the user. Items may be shared if the item is an item desired by the user that the user wants to inform others about. For example, if the item is an item that the user wishes to receive for her birthday, the user may share the item with family members to alert them to a possible gift opportunity. The eCFS 200 may arrange for the item to be shared with designated recipients across one or more communication channels. To the extent needed, the eCFS 200 may engage third party or external services to perform the sharing. For example, the eCFS 200 may engage an e-mail program on the client device 106 to generate an email to the designated recipients. The eCFS 200 also may interface with one or more social networks (e.g., Facebook, Google+, Twitter) to publish the item to designated recipients.

If the action is not to share the item, the example method proceeds to decision block 712, where it is determined whether the action to be performed is a status check of the item. If so, at block 714, a status check of the item may be performed. In some embodiments, the status check may entail the eCFS 200 interfacing with a retailer or provider of the item to determine whether the price or available quantity of the item has changed or whether a new version of the item is available. In other embodiments, the status check may entail checking on the status of an already purchased item. The eCFS 200 may maintain both purchased and not purchased items in its folders. The eCFS 200 may interface with the retailer or provider of the item or with a shipping carrier to determine a status of an order, including one or more of a location of a package containing the item, an estimated shipping and/or arrival date of the item, and the like. If the action to be performed is not a status check, the example method may end at termination block 716.

Figure 8:
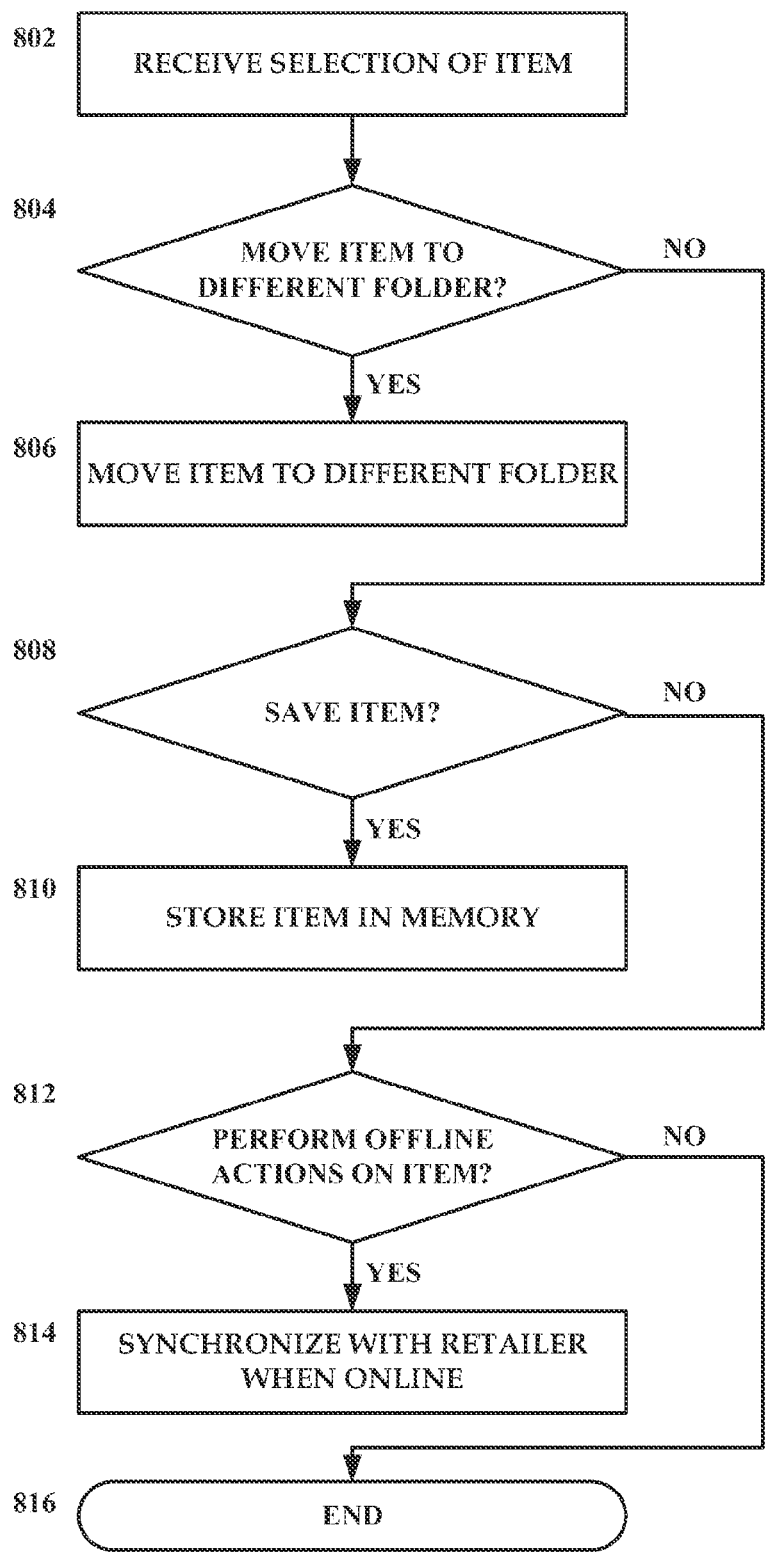
FIG. 8 is a flow diagram of an example method for transacting electronic commerce using an electronic commerce file system, according to some embodiments.

FIG. 8 is a flow diagram of an example method for transacting electronic commerce using an electronic commerce file system, according to some embodiments. At block 802, the eCFS 200 may receive the selection of an item contained in a folder. At decision block 804, it is determined whether an action to be performed with respect to the item is a move item command. If so, at block 806, the item may be moved from a source folder to a destination folder. Associated item information may be moved with the item to the destination folder.

If the action to be performed is not a move item command, the example method proceeds to decision block 808, where it is determined whether the action to be performed is a save item command. If so, at block 810, the item may be saved in a different location, such as a database, a remote network storage device, a different hard drive or RAM location, and the like.

If the action to be performed is not a save item command, the example method proceeds to decision block 812, where it is determined whether the action to be performed is being performed offline. In some embodiments, the eCFS 200 permits offline actions to be taken with respect to items. "Offline" in some embodiments may mean that the client device 106 is not connected to a network, while in other embodiments, "offline" may mean that actions are being performed within the eCFS 200 and not on the retailer website or app. If offline actions are being performed, in block 814, the eCFS 200 may synchronize the actions performed with one or more third party systems corresponding to one or more retailers or providers of the items being acted on. Synchronization may correspond to the transmission of requests for information, orders for the purchase of items, return orders for the return and/or refund of items, publication of posts about the item to one or more publication sites, commands to list or offer an item for sale, and the like. If the action to be performed is not an offline action, the example method ends at termination block 816.

Figure 9:
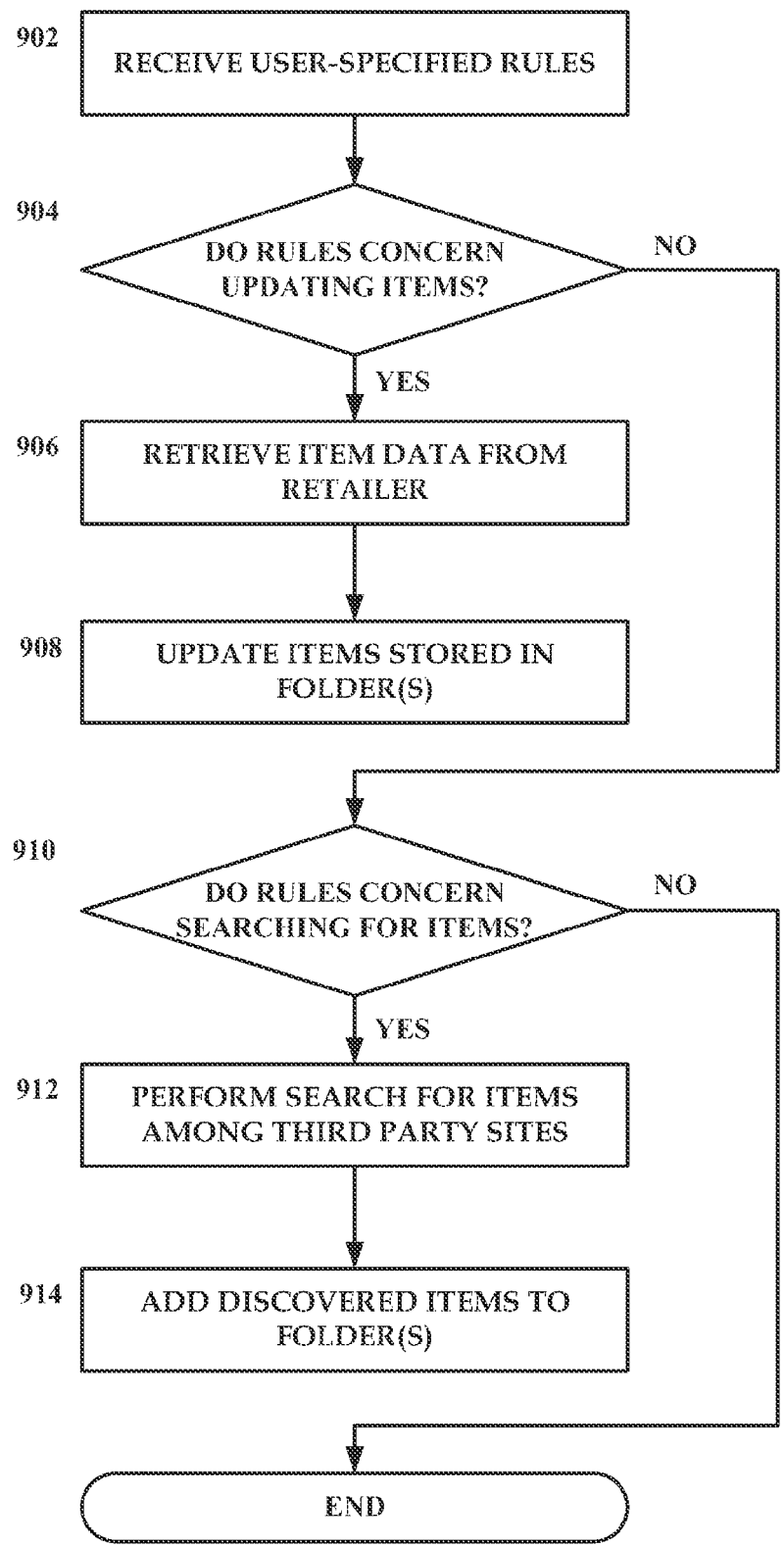
FIG. 9 is a flow diagram of an example method for transacting electronic commerce using an electronic commerce file system, according to some embodiments.

FIG. 9 is a flow diagram of an example method for transacting electronic commerce using an electronic commerce file system, according to some embodiments. At block 902, the eCFS 200 may receive or generate one or more rules that control how aspects of the eCFS 200 operate. The rules may be user-specified or may be automatically generated based on observed user actions, preferences, and tendencies. At decision block 904, it is determined if the rules relate to updating items. If so, at block 906, the eCFS 200 may apply the specified rules and request updated item information from one or more item providers. The rules may specify a frequency of updating, the type of information to be updated, and the like. At block 908, the eCFS 200 may process the received updates and update the items contained in the folder.

If the action to be performed is not an updating of item information, the example method proceeds to decision block 910, where it is determined whether the rules concern searching for items. If so, at block 912, the eCFS 200 may perform a search for items based on criteria specified in the rules. The rules may specify search terms, sites to search, item criteria that must be met to be returned in a search, and the like. The search may be performed both on retailer and item provider websites as well as general purpose search engines. At block 914, the discovered items may be added to the eCFS folders. The items may be analyzed and categorized based on metadata and/or user preferences for placement in one or more of the folders.

Figure 10:
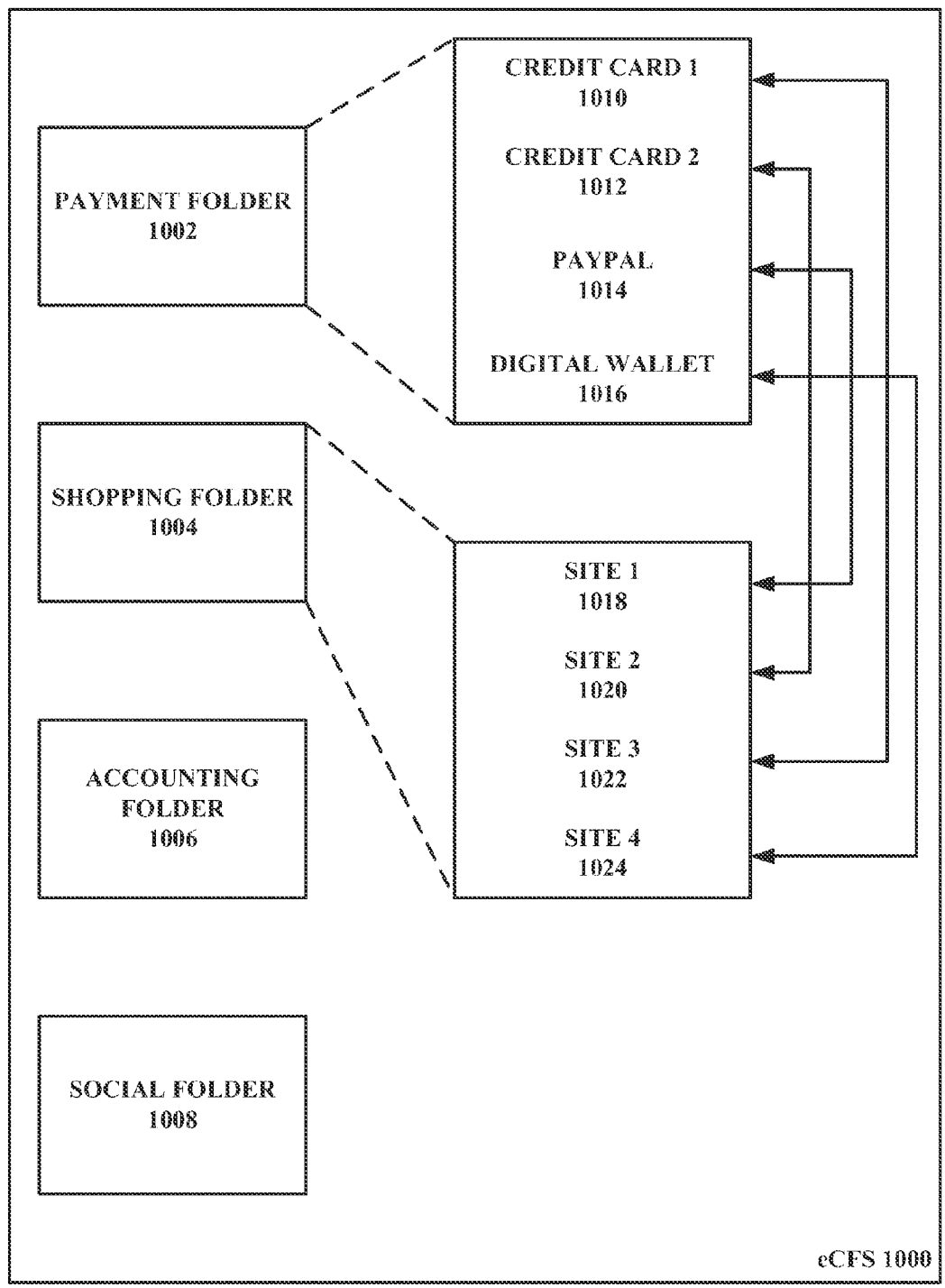
FIG. 10 is a block diagram of an electronic commerce file system, according to some embodiments.

FIG. 10 is a block diagram of an electronic commerce tile system, according to some embodiments. Referring to FIG. 10, an eCFS 1000 may include one or more folders, with each folder capable of storing one or more items. The folders may correspond to different groups of items or different functions in an e-commerce environment. As shown in FIG. 10, the eCFS 1000 may include a payment folder 1002, a shopping folder 1004, an accounting folder 1006, and asocial folder 1008. In some embodiments, the items or data contained in one folder may be related, linked, mapped to, or connected to items or data in other folders. For example, the payment folder 1002 may store various payment mechanisms and data used by a user to facilitate e-commerce transactions. The payment folder 1002 may include data pertaining to a first credit card 1010, a second credit card 1012, a PayPal account or other payment or funding account, and a digital wallet. Credit card data may include such things as a credit card number, a card security code (e.g., Card Verification Value (CVV or CVV2)), a billing address, one or more shipping addresses used with the card, a card expiration date, and so forth. PayPal or other payment account data may pertain to one or more online or Internet-based payment accounts or accounts used to facilitate the transfer or disbursement of money. Such account information may include a user name, a saved password, one or more accounts linked to the payment account (that may fund the account or to which funds from the payment account may be transferred), and so forth. Digital wallet data may include one or more digital currencies (e.g., digital cash, gift card value, credits, proprietary currencies), including an identification of each digital currency and a value of each digital currency. Digital wallet data also may include virtual goods and intangible assets each have a value associated therewith and each having an ownership that may be transferred or traded in a transaction.

The four items included in the payment folder 1002 are merely examples. It is contemplated that other payment mechanisms and types (e.g., checking accounts, savings accounts, stock accounts) may be included in the payment folder 1002.

The shopping folder 1004 may include one or more e-commerce websites at which the user has browsed for, purchased, and/or sold items. The e-commerce websites may include retailer websites, electronic marketplaces, online classifieds sites, online auction sites, and so forth. In some embodiments, the websites may be separated by preference or popularity, with favorite websites being denoted in some manner. In some embodiments, the websites may be sorted and/or grouped by the type of item sold on the website or by the type of transacting activity occurring on the website or performed by the user on the website websites where the user purchased an item(s), websites where the user sold an item(s)). In some embodiments, data pertaining to the user's interaction with the website may be stored in the shopping folder 1004. For example, if the user purchased an item on site 1 1018, data concerning the transaction (e.g., item purchased, shipping address used, billing address used, payment mechanism used) may be stored and affiliated with site 1 1018 within the shopping folder 1004.

Although not shown, accounting folder 1006 may include data used in the accounting of transactions involving the user. For example, accounting data may include a history of transactions, budget data, bank account information, transaction ledgers, and so forth. The accounting data may enable a user to track an amount spent on various items or categories of items, an amount spent per website or store, an amount sold in aggregate or per website or store. The accounting data may aid in inventory management and the calculation of sales data and figures.

The social folder 1008 may store user contact information, user account information for one or more social networking sites, user account information to one or more instant message or chat services, and so forth. The social folder 1008 may interface with one or more social networking sites, chat services, and the like to retrieve social networking data, such as friend requests, messages, posts, recommendations, polls, interests, activities, location-based data, and so forth.

In some embodiments, the data stored in the folders of the eCFS may be mapped or linked. For example, the user may shop on site 1 1018 and engage in a transaction using credit card 1 1010. Site 1 1018 and credit card 1 1010 may be mapped to show a relationship between the two pieces of data. Similarly, the user may use credit card 2 1012 in a transaction occurring on site 2 1020, and as a result, the two folder items may be linked or mapped to each other. In some embodiments, the eCFS 1000 may include logic that automatically identifies folder items that may be linked based on prior activities. In other embodiments, the user may manually link two or more folder items together.

In some embodiments, user activities pertaining to one folder may be used to populate folder items in another folder. For example, if a user performs shopping and transacting activities on one or more sites (e.g., site 1 1018, site 2 1020, site 3 1022, site 4 1024), data pertaining to the transactions may be used to populate other folders, such as the payment folder 1002 or the accounting folder 1006. The eCFS 1000 may determine the type of data to use to populate a folder based on the folder type and/or default settings associated with each folder. For example, the eCFS 1000 may populate the payment folder 1002 with payment accounts used to complete transactions on sites included in the shopping folder 1004, while the eCFS 1000 may know to avoid populating the payment folder 1002 with accounting data.

In some embodiments, the user may adjust or modify the configuration settings of each folder to specify the types of data to be included within the folder, the frequency of updating, the types of data to omit from inclusion in the folder, and the like. In some embodiments, the user may view the mappings for each item in each folder to determine the relationship between the item and items in other folders. For example, a user may select credit card 1 1010 in payment folder 1002. The eCFS 1000 may generate a visual representation (e.g., a graph) of the mappings for credit card 1 1010 to enable the user to visually ascertain the items the credit card is linked to. For example, the visual representation may illustrate that the user has used credit card 1 1010 in a transaction performed on site 3 1022 (maintained in shopping folder 1004) and that credit card 1 1010 is currently overdue (maintained in accounting folder 1006). The visual representation may further illustrate nth degree connections, such as second degree connections involving the credit card. For example, the user may visually determine that a recommendation for an item may be a friend was purchased on a retailer website using the credit card, with the recommendation and friend data being maintained in the social folder 1008, the retailer website data being maintained in the shopping folder 1006, and the credit card data being maintained in payment folder 1004.

In some embodiments, the user may set default configuration settings within the eCFS 1000 regarding the population of items within folders and crosslinking and mapping of items among folders. The eCFS 1000 may be instructed to automatically extract pertinent information for use in populating various folders (e.g., extracting payment information from a transaction for populating the payment folder 1004). The eCFS 1000 also may be instructed to automatically cross-link items among folders for visualization and ease of use purposes (e.g., credit card 1 1010 is linked to site 3 1022 such that the next time a transaction is performed on site 3 1022, credit card 1 1010 may be automatically used to complete the transaction or may be surfaced as the default payment option for the transaction).

Modules, Components, and Logic

Additionally, certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations as described herein. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time. The processor may be temporary configured or permanently configured to perform relevant operations. Whether temporarily configured or permanently configured, such processors may constitute processor-implemented modules that operate to perform one or more operations or functions.

Modules can provide information, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output Modules may also initiate communications with input or output devices and can operate on a resource (e.g., a collection of information).

Example Machine Architecture and Machine-Readable Medium

Figure 11:
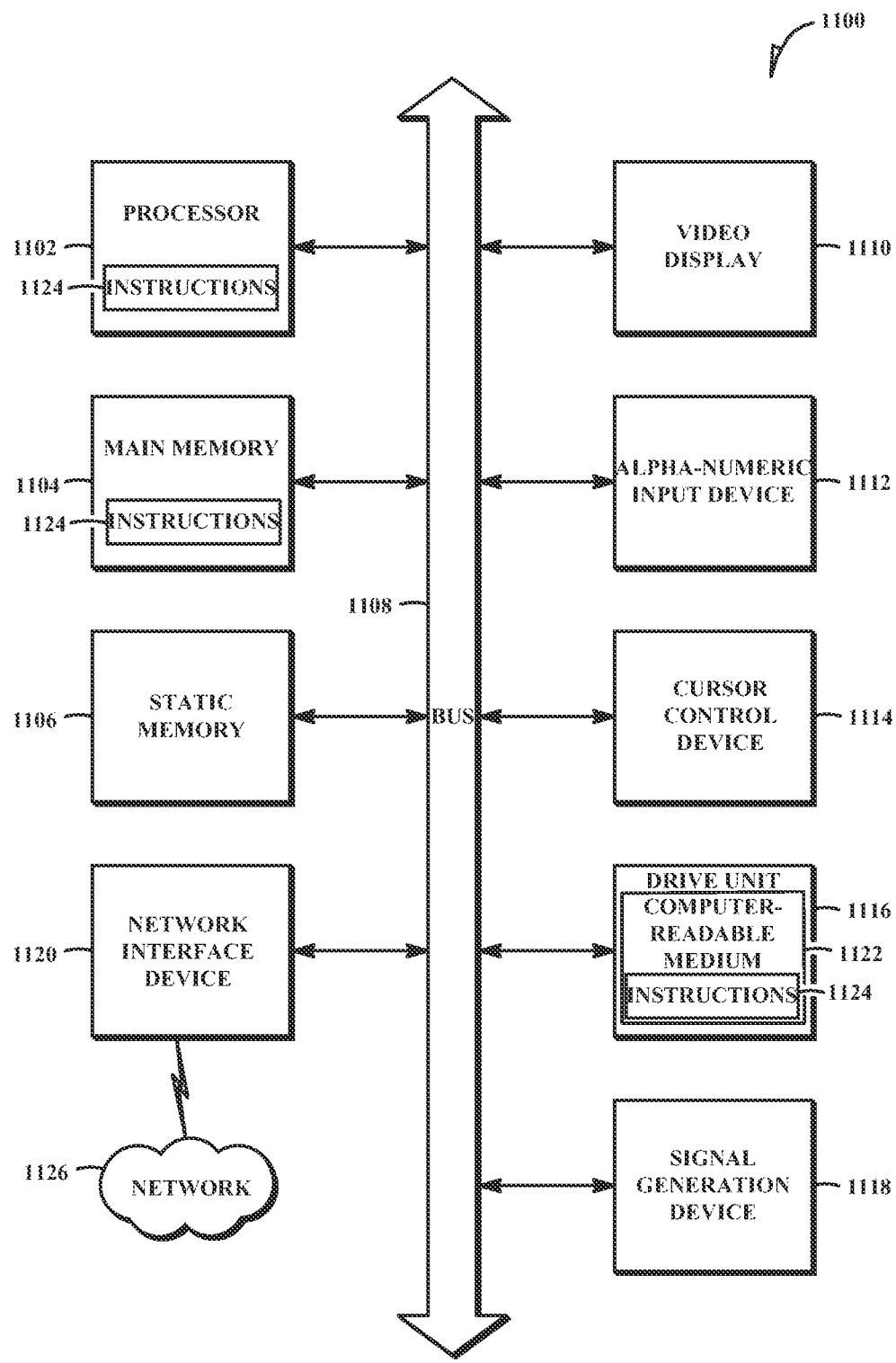
FIG. 11 is a simplified block diagram of a machine in an example form of a computing system within which a set of instructions for causing the machine to perform any one or more of the methodologies discussed herein may be executed.

With reference to FIG. 11, an example embodiment extends to a machine in the example form of a computer system 1100 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 may include a processor 1102 (e.g., a central processing unit (CPU), a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). In example embodiments, the computer system 1100 also includes one or more of an alpha-numeric input device 1112 (e.g., a keyboard), a user interface (UI) navigation device or cursor control device 1114 (e.g., a mouse), a disk drive unit 1116, a signal generation device 1118 (e.g., a speaker), and a network interface device 1120.

Machine-Readable Storage Medium

The disk drive unit 1116 includes a machine-readable storage medium 1122 on which is stored one or more sets of instructions 1124 and data structures (e.g., software instructions) embodying or used by any one or more of the methodologies or functions described herein. The instructions 1124 may also reside, completely or at least partially, within the main memory 1104 or within the processor 1102 during execution thereof by the computer system 1100, with the main memory 1104 and the processor 1102 also constituting machine-readable media.

While the machine-readable storage medium 1122 is shown in an example embodiment to be a single medium, the term "machine-readable storage medium" may include a single medium or multiple media a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 1124 may further be transmitted or received over a communications network 1126 using a transmission medium via the network interface device 1120 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   receiving, at a client device while the client device is in electronic communication with an electronic commerce provider, a first user selection of a visual representation of an item being offered for sale by the electronic commerce provider;
   receiving, at the client device while the client device is in electronic communication with the electronic commerce provider via a network, a second user selection of a folder of one or more folders of an electronic commerce file system, the electronic commerce file system residing locally on the client device;
   based on the first user selection and the second user selection,
      retrieving, from the electronic commerce provider while the client device is in electronic communication with the electronic commerce provider, item data describing the item; and
      placing an item object representing the selected item in the selected folder, the item object comprising the retrieved item data;
   receiving, at the client device while the client device is not in electronic communication with the electronic commerce provider, a third user selection of the item object;
   based on a type of the folder in which the item object is located, presenting, at the client device, a plurality of item action options;
   receiving, at the client device while the client device is not in electronic communication with the electronic commerce provider, a fourth user selection of an item action option of the plurality of item action options in conjunction with the third user selection of the item object;
   updating the object item to indicate the selected item action option; and
   synchronizing, based on the client device being in electronic communication with the electronic commerce provider, the electronic commerce file system with the electronic commerce provider, the synchronizing comprising transmitting, from the client device to the electronic commerce provider, a command based on the selected item action option.

2. The method of claim 1, wherein the visual representation of the item being offered for sale by the electronic commerce provider is presented at a website of the electronic commerce provider.

3. The method of claim 1, wherein the client device and the electronic commerce provider communicate via an application programming interface of the electronic commerce file system and an application programming interface of the electronic commerce provider.

4. The method of claim 1, wherein the plurality of item action options comprises at least one of a purchase action and a status check action based on the type of the folder in which the item object is located being a shopping list, and wherein the plurality of item action options comprises a share action based on the type of the folder in which the item object is located being a wish list.

5. The method of claim 1, wherein the selected item action option comprises a purchase action of the item, and wherein the command based on the selected item action option comprises an order for the purchase of the item.

6. A non-transitory machine-readable medium having no transitory signals, the machine-readable medium storing instructions which, when executed by the at least one processor of a machine, cause the machine to perform operations comprising:
  receiving, at a client device while the client device is in electronic communication with an electronic commerce provider, a first user selection of a visual representation of an item being offered for sale by the electronic commerce provider;
  receiving, at the client device while the client device is in electronic communication with the electronic commerce provider via a network, a second user selection of a folder of one or more folders of an electronic commerce file system, the electronic commerce file system residing locally on the client device;
  based on the first user selection and the second user selection,
    retrieving, from the electronic commerce provider while the client device is in electronic communication with the electronic commerce provider, item data describing the item; and
    placing an item object representing the selected item in the selected folder, the item object comprising the retrieved item data;
  receiving, at the client device while the client device is not in electronic communication with the electronic commerce provider, a third user selection of the item object;
  based on a type of the folder in which the item object is located, presenting, at the client device, a plurality of item action options;
  receiving, at the client device while the client device is not in electronic communication with the electronic commerce provider, a fourth user selection of an item action option of the plurality of item action options in conjunction with the third user selection of the item object;
  updating the object item to indicate the selected item action option; and
  synchronizing, based on the client device being in electronic communication with the electronic commerce provider, the electronic commerce file system with the electronic commerce provider, the synchronizing comprising transmitting, from the client device to the electronic commerce provider, a command based on the selected item action option.

7. The non-transitory machine-readable medium of claim 6, wherein the visual representation of the item being offered for sale by the electronic commerce provider is presented at a website of the electronic commerce provider.

8. The non-transitory machine-readable medium of claim 6, wherein the client device and the electronic commerce provider communication via an application programming interface of the electronic commerce file system and an application programming interface of the electronic commerce provider.

9. The non-transitory machine-readable medium of claim 6, wherein the plurality of item action options comprises at least one of a purchase action and a status check action based on the type of the folder in which the item object is located being a shopping list, and wherein the plurality of item action options comprises a share action based on the type of the folder in which the item object is located being a wish list.

10. The non-transitory machine-readable medium of claim 6, wherein the selected item action option comprises a purchase action of the item, and wherein the command based on the selected item action option comprises an order for the purchase of the item.

11. A system comprising:
  at least one processor of a client device; and
  a memory comprising instructions that, when executed by the at least one processor, cause the client device to perform operations comprising:
    receiving, at the client device while the client device is in electronic communication with an electronic commerce provider via a network, a first user selection of a visual representation of an item being offered for sale by the electronic commerce provider;
    receiving, at the client device while the client device is in electronic communication with the electronic commerce provider via a network, a second user selection of a folder of one or more folders of an electronic commerce file system, the electronic commerce file system residing locally on the client device;
    based on the first user selection and the second user selection,
      retrieving, from the electronic commerce provider while the client device is in electronic communication with the electronic commerce provider, item data describing the item; and
      placing an item object representing the selected item in the selected folder, the item object comprising the retrieved item data;
    receiving, at the client device while the client device is not in electronic communication with the electronic commerce provider, a third user selection of the item object;
    based on a type of the folder in which the item object is located, presenting, at the client device, a plurality of item action options;
    receiving, at the client device while the client device is not in electronic communication with the electronic commerce provider, a fourth user selection of an item action option of the plurality of item action options in conjunction with the third user selection of the item object;
    updating the object item to indicate the selected item action option; and
    synchronizing, based on the client device being in electronic communication with the electronic commerce provider, the electronic commerce file system with the electronic commerce provider, the synchronizing comprising transmitting, from the client device to the electronic commerce provider, a command based on the selected item action option.

12. The system of claim 11, wherein the visual representation of the item being offered for sale by the electronic commerce provide is presented at a website of the electronic commerce provider.

13. The system of claim 11, wherein the client device and the electronic commerce provider communicate via an application programming interface of the electronic commerce file system and an application programming interface of the electronic commerce provider.

14. The system of claim 11, wherein the selected item action option comprises a purchase action of the item, and wherein the command based on the selected item action option comprises an order for the purchase of the item.

\* \* \* \* \*

UNITED STATES PATENT AND TRADEMARK OFFICE
CERTIFICATE OF CORRECTION

PATENT NO. : 9,552,597 B2
APPLICATION NO. : 13/399112
DATED : January 24, 2017
INVENTOR(S) : Godsey et al.

It is certified that error appears in the above-identified patent and that said Letters Patent is hereby corrected as shown below:

In the Claims

In Column 21, Line 11, in Claim 6, after "by", delete "the"

Signed and Sealed this
Seventeenth Day of April, 2018

Andrei Iancu
*Director of the United States Patent and Trademark Office*